(12) United States Patent
Halley et al.

(10) Patent No.: US 6,910,616 B2
(45) Date of Patent: Jun. 28, 2005

(54) PREFORMS FOR FORMING MACHINED STRUCTURAL ASSEMBLIES

(75) Inventors: Jeremiah E. Halley, St. Louis, MO (US); Kevin T. Slattery, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 286 days.

(21) Appl. No.: 10/092,675

(22) Filed: Mar. 7, 2002

(65) Prior Publication Data

US 2003/0168494 A1 Sep. 11, 2003

(51) Int. Cl.$^7$ .......................... B23K 20/12; B23K 31/02
(52) U.S. Cl. ..................... 228/112.1; 228/2.1; 228/113; 228/114.5
(58) Field of Search .............................. 228/112.1, 113, 228/114, 114.5, 2.1

(56) References Cited

U.S. PATENT DOCUMENTS

| | | | |
|---|---|---|---|
| 3,570,740 A | | 3/1971 | Stamm |
| 3,831,459 A | * | 8/1974 | Satzler et al. .................. 74/439 |
| 3,841,201 A | * | 10/1974 | Kiwalle et al. ............. 409/295 |
| 4,087,038 A | * | 5/1978 | Yagi ........................ 228/114.5 |
| 4,945,019 A | | 7/1990 | Bowen et al. |

(Continued)

FOREIGN PATENT DOCUMENTS

| | | |
|---|---|---|
| EP | 1048390 A2 | 11/2000 |
| EP | 1057572 A2 | 12/2000 |

OTHER PUBLICATIONS

Website of TWI Technology at http://www.twi.co.uk/tech-file/tffricli.html; 1 page dated Dec. 8, 2000.
Website of TWI Technology at http://www.twi.co.uk/connect/may00/c1063.html; 3 pages dated Dec. 8, 2000.
Website of University of Southhampton, Faculty of Mathematical Studies at http://www.maths.soton.ac.uk/esgi98/problems/rolls.html; 1 page dated Dec. 8, 2000.
Website of MTS Systems Corporation at http://www-.mts.com/aesd/AdvanMan.htm; 2 pages dated Dec. 8, 2000 (Copyright 2000).
Website of MTS Systems Corporation at http://www.mts.com/aesd/aerospace engine.htm; 1 page dated Nov. 13, 2000 (Copyright 2000).
Website of Inside Communications Limited at http://www.insidecom.co.uk/pwe/editorial/pwe352.htm; 2 pages dated Nov. 13, 2000.
Advanced Materials & Processes 2/91; Tech Spotlight, Linear friction welding joins noncircular sections; p. 47.
D. L. Hollar, Jr.; Resistance Seam Welding of Thin Copper Foils; Welding Journal; Jun., 1993; pp. 37–40.

*Primary Examiner*—Lynne R. Edmondson
(74) *Attorney, Agent, or Firm*—Alston & Bird LLP

(57) ABSTRACT

A method of constructing a preform for use in forming a machined structural assembly is provided. The method includes determining the dimensions of the machined structural assembly. First and second structural members are selected based on the predetermined dimensions of the machined structural assembly. The first structural member is positioned adjacent the second structural member so as to define at least two contact surfaces. The contact surfaces of the first and second structural members are friction welded to construct the preform such that the preform has dimensions approximating the dimensions of the machined structural assembly to thereby reduce material waste when forming the machined structural assembly. A machined structural assembly having predetermined dimensions is formed from the preform by machining away excess material.

23 Claims, 8 Drawing Sheets

U.S. PATENT DOCUMENTS

| | | | |
|---|---|---|---|
| 5,168,841 A | * 12/1992 | Suzuki et al. | 123/90.48 |
| 5,248,077 A | * 9/1993 | Rhoades et al. | 228/112.1 |
| 5,366,344 A | * 11/1994 | Gillbanks et al. | 416/213 R |
| 5,425,821 A | 6/1995 | Kurup et al. | |
| 5,469,617 A | * 11/1995 | Thomas et al. | 29/889.21 |
| 5,470,524 A | * 11/1995 | Krueger et al. | 419/5 |
| 5,551,623 A | * 9/1996 | Collot et al. | 228/112.1 |
| RE35,664 E | * 11/1997 | Searle | 228/2.1 |
| 5,682,677 A | 11/1997 | Mahoney | |
| 5,697,544 A | 12/1997 | Wykes | |
| 5,718,366 A | 2/1998 | Colligan | |
| 5,769,306 A | 6/1998 | Colligan | |
| 5,794,835 A | 8/1998 | Colligan et al. | |
| 5,865,364 A | * 2/1999 | Trask et al. | 228/212 |
| 5,971,247 A | 10/1999 | Gentry | |
| 6,022,194 A | * 2/2000 | Amos et al. | 416/219 R |
| 6,050,474 A | 4/2000 | Aota et al. | |
| 6,068,178 A | 5/2000 | Michisaka | |
| 6,070,784 A | 6/2000 | Holt et al. | |
| 6,079,609 A | * 6/2000 | Fochtman | 228/113 |
| 6,095,402 A | 8/2000 | Brownell et al. | |
| 6,106,233 A | 8/2000 | Walker et al. | |
| 6,168,066 B1 | 1/2001 | Arbegast | |
| 6,173,880 B1 | 1/2001 | Ding et al. | |
| 6,219,916 B1 | * 4/2001 | Walker et al. | 29/889.21 |
| 6,244,492 B1 | * 6/2001 | Kupetz et al. | 228/2.1 |
| 6,295,893 B1 | 10/2001 | Ogawa et al. | |
| 6,412,175 B2 | * 7/2002 | Labombard | 29/895.22 |
| 6,478,545 B2 | * 11/2002 | Crall et al. | 416/213 R |
| 6,524,072 B1 | * 2/2003 | Brownell et al. | 416/213 R |
| 6,669,447 B2 | * 12/2003 | Norris et al. | 416/224 |
| 6,779,708 B2 | * 8/2004 | Slattery | 228/112.1 |
| 2002/0125297 A1 | 9/2002 | Stol et al. | |

* cited by examiner

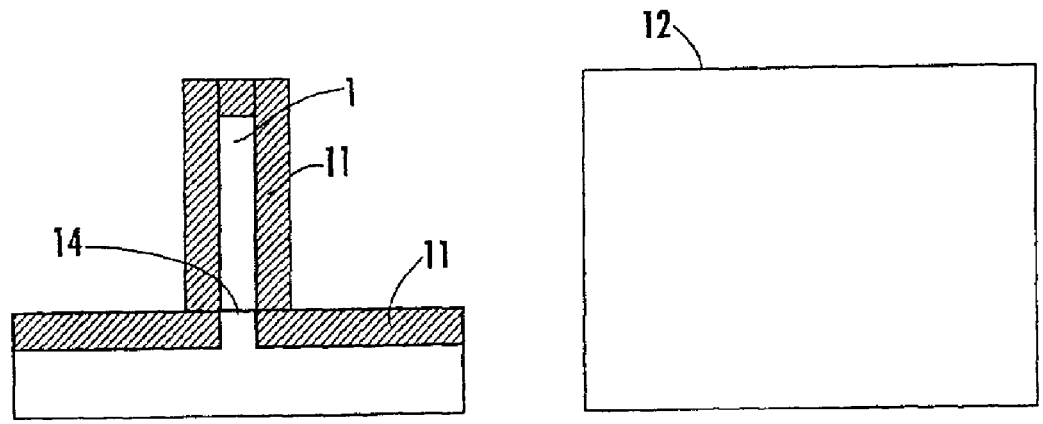
FIG. 4.
FIG. 4A.
(PRIOR ART)
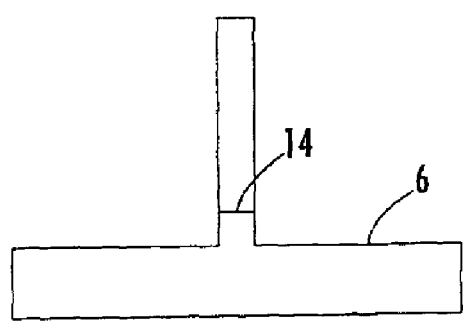
FIG. 5.
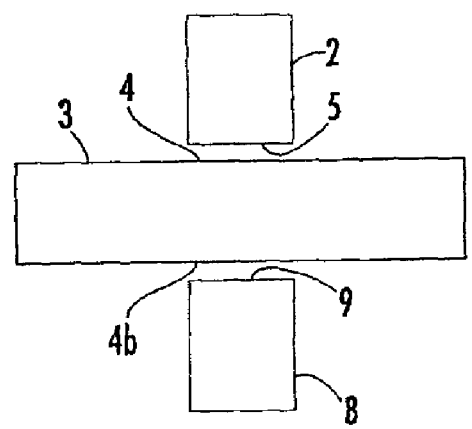
FIG. 6.

PREFORMS FOR FORMING MACHINED STRUCTURAL ASSEMBLIES

FIELD OF THE INVENTION

This invention relates to friction welding and, more specifically, to friction welding of preforms for use in forming machined structural assemblies.

BACKGROUND OF THE INVENTION

Hogout machining generally refers to a process of forming a structural assembly by removing excess material from a piece of stock material, such as a plate or block, to arrive at the desired configuration and dimensions for the assembly. Oftentimes when practicing hogout machining, the dimensions and configuration of the structural assembly are such that appreciable amounts of material must be removed. Thus, while hogout machining provides a method for forming structural assemblies having complex configurations, hogout machining can be costly due to the relatively large amount of excess material or scrap that typically must be removed and because the machining process can be time consuming and labor intensive. Hogout machining also can cause excessive wear on the cutting machine and tools, which can result in machine downtime and/or tool breakage that in turn can adversely affect the tolerances of the finished assembly. In addition, the availability of stock sizes of material limits the overall dimensions of a structural assembly formed by hogout machining.

In seeking to reduce material waste and machining times, other methods are used for forming the stock material to be used in machining a structural assembly. For example, one method is machined forging, which refers to the process of machining a part from a piece of forged stock material that approximates the final configuration. When machined forging is used, the amount of machining can be reduced because the forged stock material can be hand or die forged to dimensions that more closely approximate the desired dimensions of the finished assembly. However, the production of forged stock material can be time consuming and labor intensive and, in the case of die forgings, can require the production of costly forging dies. Die forgings can require ultrasonic inspection, as the forging process can cause internal cracks or other defects. Additionally, both die and hand forging can cause residual stresses in the forged stock material that can remain in the finished structural assembly. Residual stresses can necessitate slower cutting speeds when hogout machining and can adversely affect the material properties and tolerances of the finished assembly.

Thus, there remains a need for improved methods of forming stock material or "preforms" for use in forming machined structural assemblies. Such preforms should approximate the desired dimensions and configuration of the structural assembly to reduce the machining time required during machining, as well as reduce waste material. The desired dimensions and configuration of the structural assembly should not be limited by the sizes of available stock materials. In addition, such preforms should have negligible residual stresses so that the finished machined assembly will have consistent material properties and dimensional tolerances.

SUMMARY OF THE INVENTION

The present invention provides an improved preform, machined structural assembly, and associated methods of forming the same. In one embodiment, the present invention provides a preform for use in forming a machined structural assembly of predetermined dimensions. The preform includes a first structural member defining at least one contact surface and a second structural member defining at least one contact surface that corresponds to the contact surface of the first structural member. A friction weld joint joins the contact surfaces of the first and second structural members to thereby form a preform having dimensions approximating the dimensions of the final machined structural assembly so as to reduce material waste and machining time when forming the assembly. In one embodiment, the first and second structural members comprise aluminum, aluminum alloys, titanium, titanium alloys, nickel-based, steel, copper-based alloys, or beryllium-based alloys. In another embodiment, the first and second structural members comprise dissimilar materials. In still another embodiment, the preform comprises a third structural member friction welded to at least one of the first and second structural members.

The present invention also provides a method for constructing a preform for use in forming a machined structural assembly. The method includes determining the desired dimensions of the finished machined structural assembly. Based on the dimensions of the structural assembly, first and second structural members are selected. The first structural member is then positioned adjacent to the second structural member to define at least two contact surfaces therebetween. The first and second structural members are then friction welded together to form a preform having dimensions that approximate the dimensions of the machined structural assembly. In one embodiment, the method comprises forming a relief groove proximate to at least one of the at least two contact surfaces prior to the positioning step. In another embodiment, the method includes cleaning one or both of the contact surfaces before the positioning step. In still another embodiment, at least one of the first and second structural members is processed before friction welding through a material treatment, such as heat treating, aging, quenching, stretching, annealing, or solution annealing. In yet another embodiment of the present invention, the method of forming a preform further comprises friction welding additional structural members to at least one of the first or second structural members. For example, a third structural member may be friction welded to either of the first or second structural members or to both structural members.

According to one embodiment of the present invention, the friction welding step comprises moving at least one of the first and second structural members relative to the other structural member while concurrently urging at least one of the structural members toward the other to generate frictional heat about the contact surfaces. The moving step is then terminated, and concurrently therewith, at least one of the first and second structural members is urged toward the other as the contact surfaces cool to thereby form a friction weld joint at least partially between the contact surfaces. In one embodiment, the moving step comprises oscillating at least one of the first and second structural members relative to the other. In another embodiment, the moving step comprises moving the first and second structural members in opposing directions, wherein the opposing directions are parallel to the at least two contact surfaces of the first and second structural members forming the preform.

The present invention also provides a machined structural assembly and a method of forming a machined structural assembly. The method includes determining the dimensions of the machined structural assembly. Based on the dimensions of the machined structural assembly, a preform is constructed as described above. The preform is machined to remove excess material from the preform to form the machined structural assembly having the predetermined dimensions. In one embodiment, the preform is processed before the machining step through a material treatment, such as a heat treating, aging, quenching, stretching, annealing or solution annealing. In another embodiment, the machining step comprises machining at least a portion of the friction weld joint joining the first and second structural members.

Accordingly, there is provided a preform for forming machined structural assemblies having dimensions approximating the dimensions of the machined structural assembly to thereby reduce material waste and machining time. The dimensions of the machined structural assembly are not limited by the sizes of stock materials. Advantageously, the friction weld between the structural members provides a strong material bond with the formation of negligible residual stresses. Thus, the preform of the present invention facilitates the efficient production of structural assemblies having consistent material properties and dimensional tolerances.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein:

FIG. 4 is an elevation view illustrating the material to be removed from the preform of FIG. 2 to form a machined structural assembly;

FIG. 4A is an elevation view illustrating a conventional block of stock material used to form a hogout structural assembly, as is known in the art;

FIG. 5 is an elevation view illustrating the machined structural assembly formed from the preform of FIG. 2;

FIG. 6 is an elevation view illustrating first, second, and third structural members being positioned before friction welding, according to another embodiment of the present invention;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
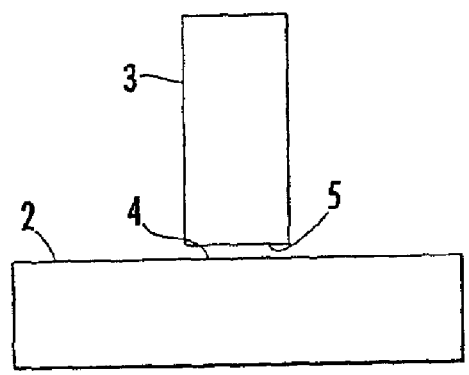
FIG. 1 is an elevation view illustrating the first and second structural members being positioned before friction welding, according to one embodiment of the present invention.
Figure 2:
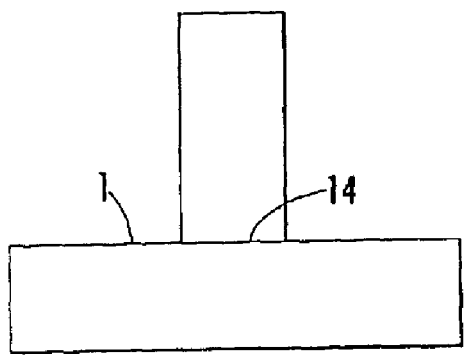
FIG. 2 is an elevation view illustrating a preform constructed from the first and second structural members of FIG. 1.
Figure 3:
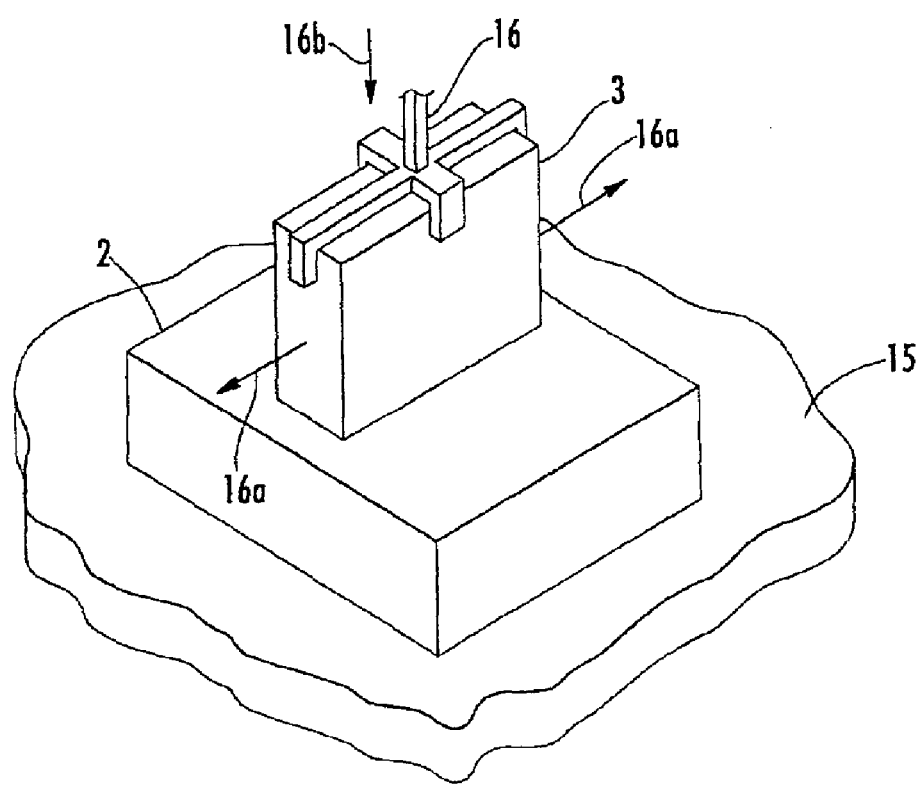
FIG. 3 is a perspective view illustrating the formation of the preform of FIG. 2.
Figure 7:
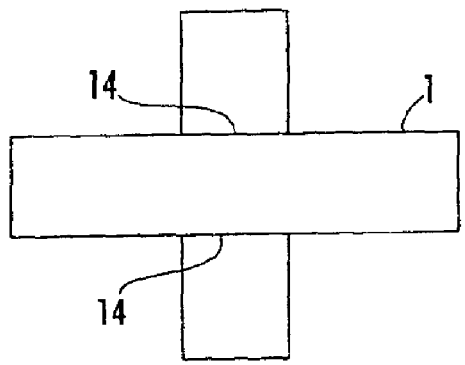
FIG. 7 is an elevation view illustrating a preform constructed from the first, second and third structural members of FIG. 6.

Referring to the drawings and, in particular, to FIGS. 1, 2, 3, 4, and 5, there is illustrated the formation of a machined structural assembly 6 from a preform, according to one embodiment of the present invention. As illustrated in FIGS. 1, 2, and 3, the preform 1 is formed from a first structural member 2 and a second structural member 3. In other embodiments, as illustrated in FIGS. 6 and 7, the preform 1 is formed from three or more structural members 2, 3, 8. The number of structural members used to construct the preform 1 will depend on the dimensions and configuration of the machined structural assembly 6, which in turn depends on the specifications and design requirements of the assembly.

The configuration and material composition of the structural members 2, 3, 8 also will vary depending on the specifications and design requirements of the assembly. The first and second structural members 2, 3 are illustrated in FIG. 1 as plates having rectangular cross-sections. However, the structural members 2, 3, 8 can be formed in other configurations, including, for purposes of example only and not limitation, blocks having rectangular or square cross-sections, tubes and cylinders having circular or oval cross-sections, or channels having L-shaped, C-shaped, U-shaped, T-shaped or V-shaped cross-sections. The structural members 2, 3 can also have irregular geometric configurations. The structural members 2, 3 can be formed from a variety of fabricating processes, as is known in the art, including milling, casting, or forging, provided that the forging process does not create appreciable residual stresses. The structural members 2, 3 preferably are formed from materials having high strength to weight ratios and good corrosion resistance. For purposes of example only and not limitation, the structural members can comprise aluminum, aluminum alloys, titanium, titanium alloys, nickel-based, steel, copper-based alloys, or beryllium-based alloys. According to one embodiment, the structural members 2, 3, 8 are formed from the same or similar materials. In another embodiment, one or more of the structural members 2, 3, 8 are formed from dissimilar materials provided that the materials will create a strong material bond when joined by friction welding.

In addition to the material composition and properties of the structural members 2, 3, 8, the selection of the structural members is based on the desired dimensions of the machined structural assembly 6 that is to be formed. More specifically, the desired dimensions of the machined structural assembly 6 are determined and then the structural members 2, 3, 8 are selected so that the resulting preform 1 will closely approximate the predetermined dimensions and configuration of the finished assembly. Advantageously, by constructing preforms having dimensions and configurations closely or substantially approximating the predetermined dimensions and configuration of the corresponding machined structural assembly 6, a reduction in machining time and material waste can be achieved, thus making these assemblies more economical to produce. One measure of wasted material in a machining process is the buy:fly ratio, which compares the mass of the block of material that is to be machined to the mass of the finished machined component. Hogout machining typically results in a buy:fly ratio of between about 10:1 and 50:1. Thus, between about 90% and 98% of the mass of a conventional block of stock material is typically removed when hogout machining is used. Buy-:fly ratios for machined structural assemblies formed according to the present invention vary, but are typically between about 2:1 and 6:1.

As illustrated in FIG. 1, the preform 1 is formed by positioning the first and second structural members 2, 3 adjacent to one another so that the first structural member 2 defines at least one contact surface 4 and the second structural member 3 defines at least one contact surface 5 corresponding to the contact surface 4 of the first structural member 2. The corresponding contact surfaces 4, 5 complement each other so that when the first and second structural members 2, 3 are brought together, the contact surface 4 of the first structural member 2 and the contact surface 5 of the second structural member 3 form an interface substantially along the entire area of the contact surfaces. The structural members can then be secured to a support, such as a backing plate or table, using clamps, bolts, tack welding, tooling or the like, or to a device for imparting movement, such as a computer numeric control (CNC) machine or similar device, as is known in the art.

Once the structural members 2, 3 are positioned opposite one another, the first and second structural members are then friction welded to form a weld joint about the interface between the structural members. Friction welding is accomplished by moving at least one of the structural members 2, 3 relative to the other structural member 2, 3, or, alternatively, moving both the structural members at the same time. As illustrated in FIG. 3, the first structural member 2 is held fixed to a support member 15, while the second structural member 3 is moved by a machine or device 16 in a linear oscillatory pattern relative to the first structural member, as indicated by the arrows 16*a*. In another embodiment (not shown), the first and second structural members 2, 3 are each moved linearly in a direction opposite to the direction of motion of the other structural member. The direction of motion of the structural member or members can vary, but preferably is generally parallel to the contact surfaces 4, 5. In other embodiments, the motion of the first and second structural members 2, 3 can be oscillatory or non-oscillatory and can have a rotational, elliptical or orbital pattern.

At the same time one or both of the structural members 2, 3 are being moved, the structural members are urged together by applying force to the second structural member 3 generally in the direction of the first structural member 2 and applying a reactive force to the first structural member 2 generally in the direction of the second structural member 3. For example, as illustrated in FIG. 3, the force applied to the second structural member 3 can be applied by the machine or device 16 used to impart the motion to the second structural member, as indicated by the arrow 16*b*, whereas the reactive force can be applied by the support member 15. In another embodiment (not shown), the forces applied to the first and second structural members 2, 3 are each generated from a machine or device used to impart the motion to the corresponding member. As the structural members 2, 3 are urged together, a compressive force is established between the contact surfaces 4, 5 along the interface defined between the structural members. The compressive force is typically great enough to result in a pressure between the structural members 2, 3 of at least about 1000 pounds per square inch. The motion of at least one of the structural members 2, 3 is continued while the compressive force is maintained resulting in friction between the structural members 2, 3. The friction between the structural members 2, 3 results in heating of the respective contact surfaces 4, 5, which causes plasticized regions to form about the contact surfaces. Once sufficient plasticization has occurred along the interface defined by the contact surfaces 4, 5, the motion between the structural members 2, 3 is then terminated. The compressive force between the structural members 2, 3 is maintained by urging the structural members together as the contact surfaces 4, 5 cool to thereby form a friction weld joint 14 about the interface.

Referring to FIGS. 6 and 7, there is illustrated a preform 1 formed from first, second and third structural members 2, 3, 8. The second and third structural members 3, 8 are joined to opposite sides of the first structural member 2. In other embodiments (not shown), the third structural member 8 can be joined to the second structural member 3 or both the first and second structural members 2, 3, depending on the desired dimensions and configuration of the machined structural assembly 6. When constructing preforms 1 having three or more structural members 2, 3, 8, the friction weld joints 14 joining the respective structural members can be formed at the same time or by first joining one pair of structural members and then joining additional members thereto.

According to one embodiment of the present invention, the structural members 2, 3, 8 are processed before friction welding. For example, the contact surfaces 4, 4*a*, 5, 9 of the structural members 2, 3, 8 are cleaned using a solvent or abrasive cleaner to remove any oxidation or surface defects so that a strong material bond can be obtained by friction welding. In other embodiments, one or more of the structural members 2, 3, 8 can undergo a material treatment, such as heat treatment, aging, quenching, stretching, annealing, or solution annealing, to obtain desired mechanical or chemical properties, as is known in the art.

Figure 10:
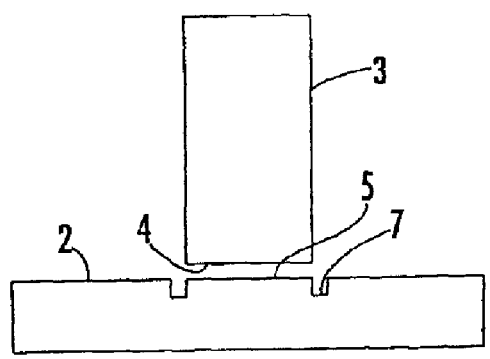
FIG. 10 is an elevation view illustrating first and second structural members being positioned before friction welding with one of the structural members having two relief grooves, according to another embodiment of the present invention.
Figure 11:
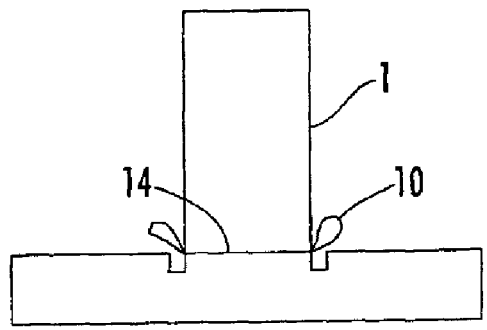
FIG. 11 is an elevation view illustrating the preform constructed from the first and second structural members of FIG. 10.
Figure 12:
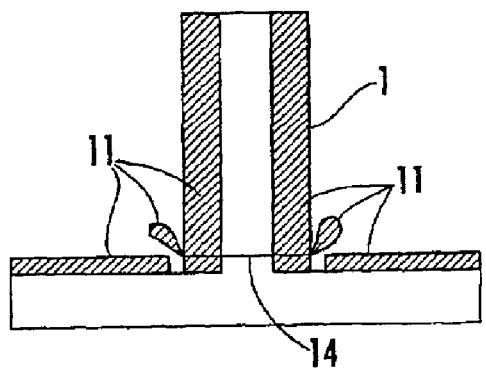
FIG. 12 is an elevation view illustrating the material to be removed from the preform of FIG. 11 to form a machined structural assembly.

In another embodiment of the present invention, as illustrated in FIGS. 10, 11, and 12, one or more relief grooves 7 are formed in at least one of the structural members 2, 3 proximate to the corresponding contact surface or surfaces 4, 5. The relief grooves 7 can be formed using cutting or routing equipment, as is known in the art. The relief grooves 7 illustrated in FIG. 10 are straight grooves disposed in the first structural member 2 parallel and proximate to the contact surface 4 defined by the first structural member 2. The position, dimensions and configuration of the relief grooves 7 can vary depending on the particular application of the machined structural assembly 6. The relief grooves 7 allow plasticized material from both the first and second structural members 2, 3 to flow, facilitating the formation for a strong weld joint between the structural members 2, 3.

Figure 8:
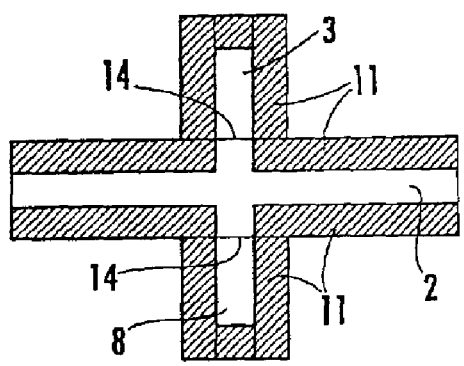
FIG. 8 is an elevation view illustrating the material to be removed from the preform of FIG. 7 to form a machined structural assembly.
Figure 8A:
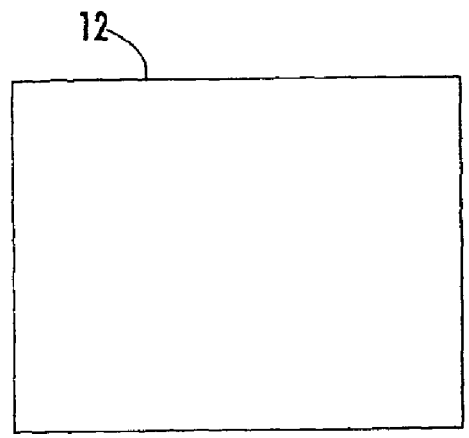
FIG. 8A is an elevation view illustrating a conventional block of stock material used to form a hogout structural assembly, as is known in the art.
Figure 9:
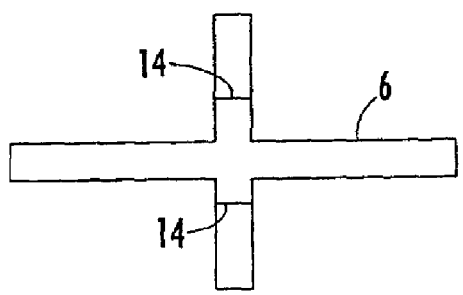
FIG. 9 is an elevation view illustrating the machined structural assembly formed from the preform of FIG. 7.
Figure 12A:
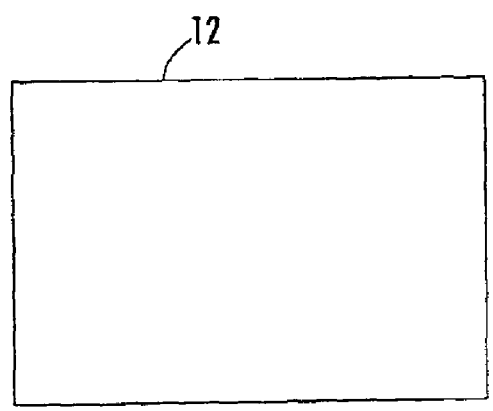
FIG. 12A is an elevation view illustrating a conventional block of stock material used to form a hogout structural assembly, as is known in the art.

As illustrated in FIGS. 4 and 5, FIGS. 8 and 9, and FIGS. 12 and 13, once the preform 1 is formed a predetermined amount of excess material 11 can be machined from the preform to form the machined structural assembly 6. The machining process can be performed by any known means, including using a manual or computer-guided machining device, such as a CNC machine. As illustrated in FIGS. 4 and 5 and FIGS. 12 and 13, excess material 11 is removed from the entire exposed surface of the second structural member 3, but only a portion of the exposed surface of the first structural member 2. As illustrated in FIGS. 8 and 9, substantially all of the entire exposed surface of the first, second, and third structural members 2, 3, 8 is removed. Advantageously, because the preforms 1 closely or substantially approximate the predetermined dimensions and configuration of the corresponding machined structural assembly 6, the amount of machining is relatively small compared to, for example, the amount of machining that would be required to machine hogout structural assemblies from solid rectangular blocks of material 12, such as those illustrated in FIGS. 4A, 8A and 12A.

Figure 13:
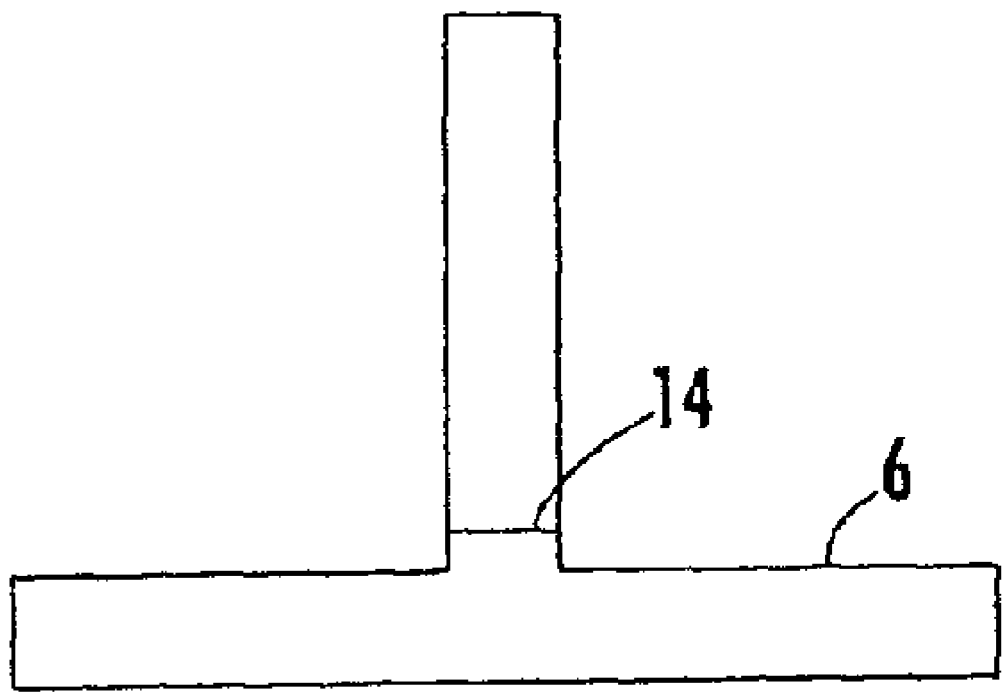
FIG. 13 is an elevation view illustrating the machined structural assembly formed from the preform of FIG. 11.

As illustrated in FIGS. 10, 11, and 12, friction welding structural members 2, 3 defining one or more relief grooves 7 can result in the formation of extraneous material deposits in the form of flash or spars 10. The flash 10 results from extrusion of plasticised material during friction welding due to the compressive force between the structural members 2, 3 as the members are urged together. The high compressive force causes some of the plasticised material to be extruded from the region between the contact surfaces 4, 5, which can collect, forming a bead or multiple isolated deposits adjacent to each side of the weld joint 14. As illustrated in FIGS. 12 and 13, the flash 10 is typically removed when machining the preform 1 to form the machined structural assembly 6.

Figure 14:
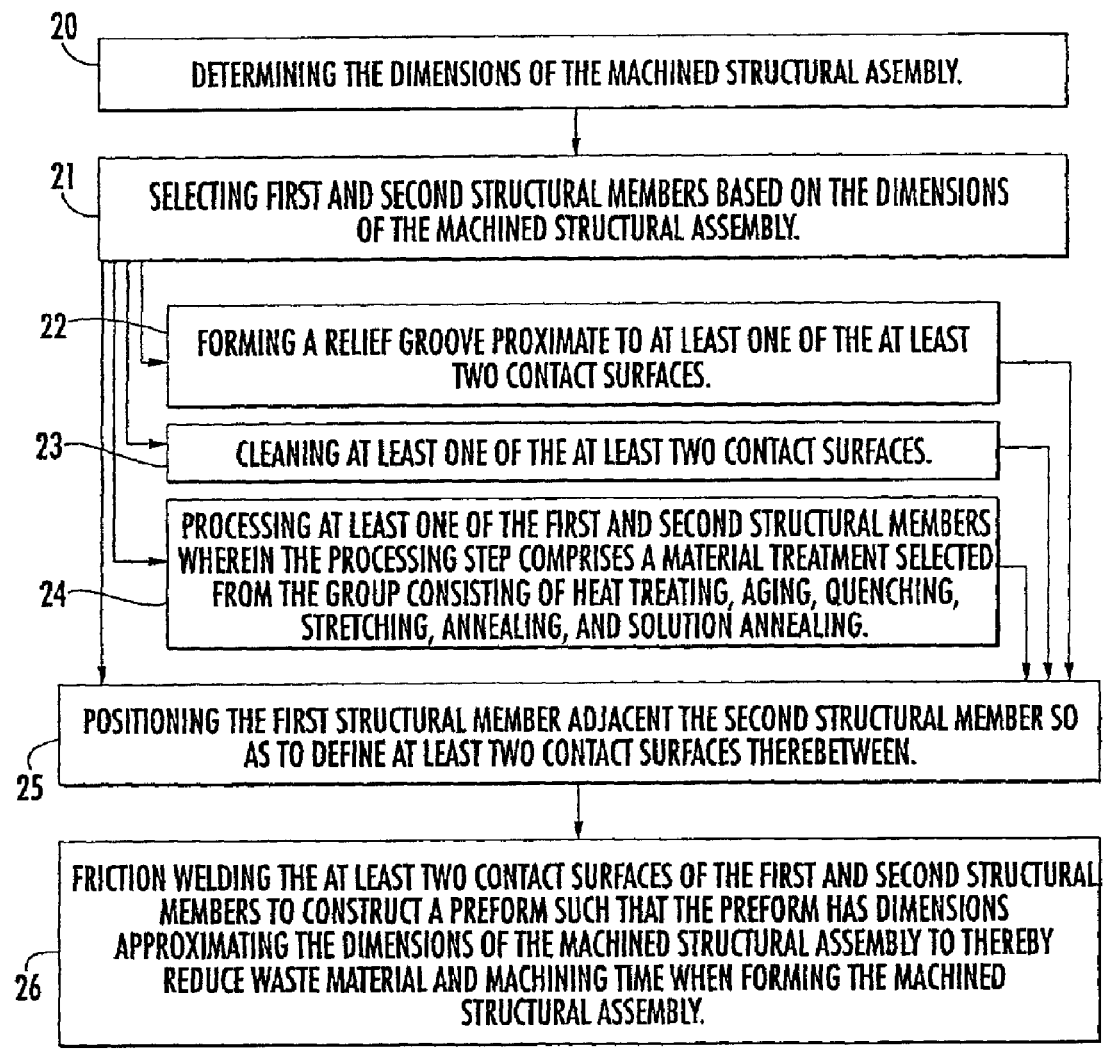
FIG. 14 is a flow chart illustrating a method for forming a preform, according to one embodiment of the present invention.

Referring to FIG. 14, there is illustrated the operations performed in forming a preform, according to one embodiment of the present invention. The method includes determining the desired dimensions of the machined structural assembly. See Block 20. Based on the dimensions of the structural assembly, first and second structural members are selected. See Block 21. In one embodiment, the method comprises forming a relief groove proximate to at least one of the at least two contact surfaces prior to the positioning step. See Block 22. In another embodiment, the method includes cleaning one or both of the contact surfaces before the positioning step. See Block 23. In still another embodiment, at least one of the first and second structural members is processed before friction welding through a material treatment, such as heat treating, aging, quenching, stretching, annealing, or solution annealing. See Block 24. The first structural member is then positioned adjacent to the second structural member to define at least two contact surfaces therebetween. See Block 25. The first and second structural members are then friction welded together to form a preform having dimensions that approximate the dimensions of the machined structural assembly. See Block 26.

Figure 14A:
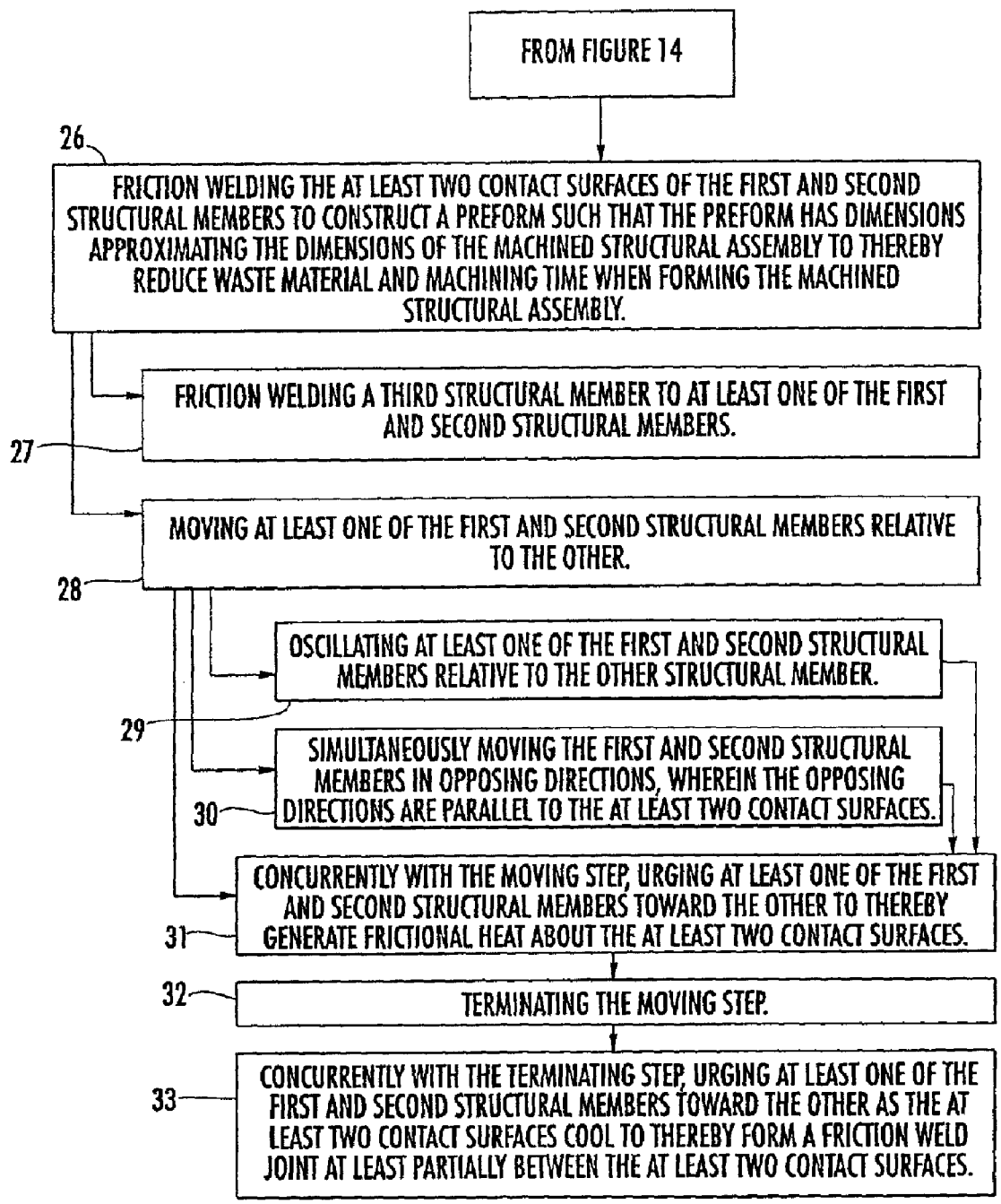
FIG. 14A is a flow chart further illustrating the method of FIG. 14.

Referring to FIG. 14A, there is illustrated the steps in friction welding the structural members of FIG. 14, according to one embodiment of the present invention. The friction welding step includes moving at least one of the first and second structural members relative to the other structural member. See Block 28. In one embodiment, the moving step comprises oscillating at least one of the first and second structural members relative to the other. See Block 29. In another embodiment, the moving step comprises moving the first and second structural members in opposing directions, wherein the opposing directions are parallel to the at least two contact surfaces of the first and second structural members forming the preform. See Block 30. Concurrently with the moving step, at least one of the structural members is urged toward the other to generate frictional heat about the contact surfaces. See Block 31. The moving step is then terminated. See Block 32. Concurrently with the termination step, at least one of the first and second structural members is urged toward the other as the contact surfaces cool to thereby form a friction weld joint at least partially between the contact surfaces. See Block 33. In one embodiment, a third structural member is friction welded to at least one of the first and second structural members. See Block 27.

Figure 15:
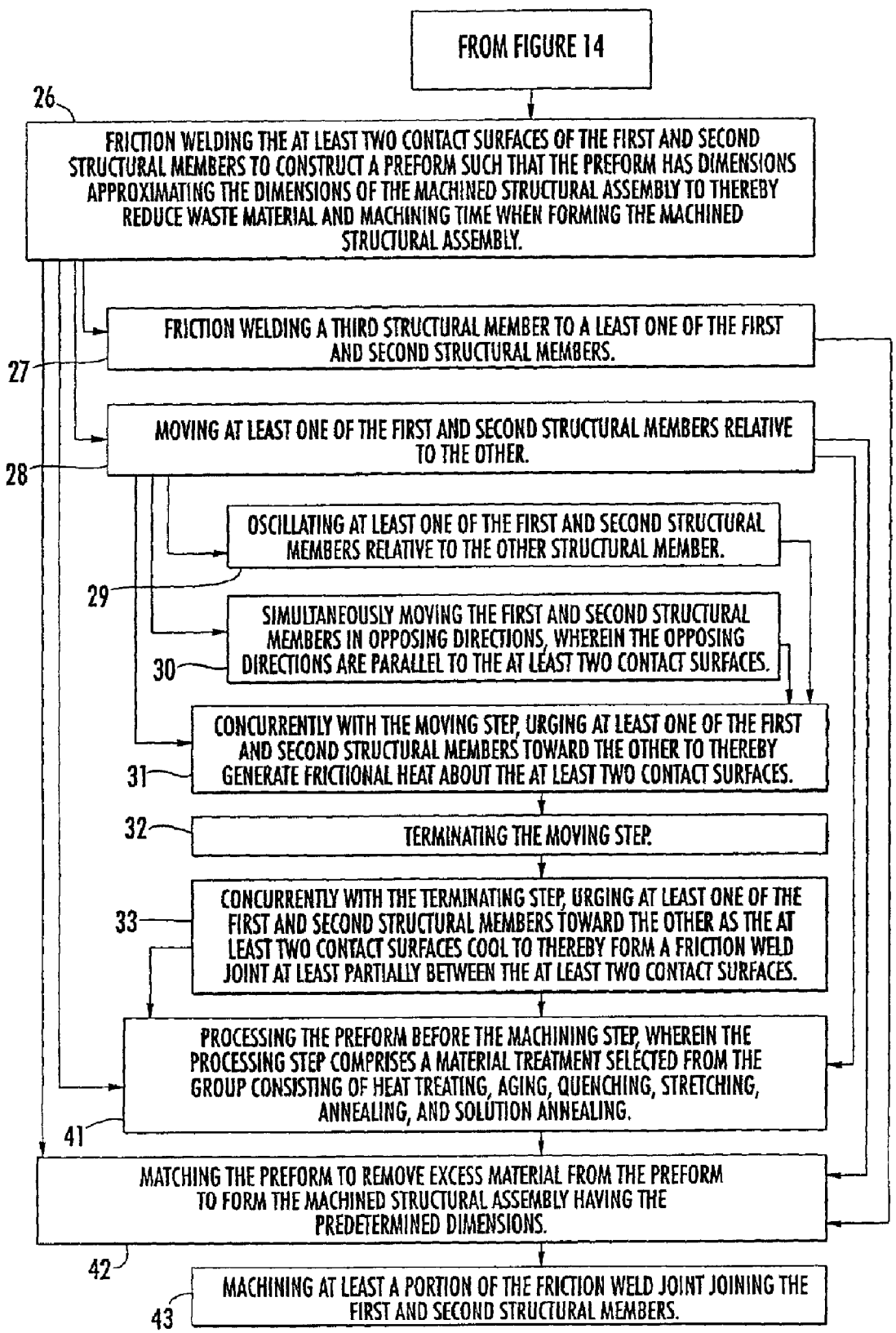
FIG. 15 is a flow chart illustrating a method for forming a machined structural assembly, according to one embodiment of the present invention.

Referring to FIG. 15, there is illustrated the operations performed in forming a machined structural assembly, according to one embodiment of the present invention. A preform is constructed as described above in connection with FIGS. 14 and 14A. The preform is machined to remove excess material from the preform to form the machined structural assembly having the predetermined dimensions. See Block 42. In one embodiment, the preform is processed before the machining step through a material treatment, such as a heat treating, aging, quenching, stretching, annealing or solution annealing. See Block 41. In another embodiment, the machining step comprises machining at least a portion of the friction weld joint joining the first and second structural members. See Block 43.

Accordingly, there is provided a preform for forming machined structural assemblies having dimensions approximating the dimensions of the machined structural assembly to thereby reduce material waste and machining time. Advantageously, the preform of the present invention facilitates the efficient production of machined structural assemblies having consistent material properties and dimensional tolerances. Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of constructing a preform for use in forming a machined structural assembly, comprising:

determining the dimensions of the machined structural assembly;

selecting first and second structural members bused on the dimensions of the machined structural assembly, the structural members including excess material such that at least one of the structural members is larger in at least one dimension than the corresponding dimension of the machined structural assembly;

positioning the first structural member adjacent the second structural member so as to define at least two contact surfaces therebetween; and linear friction welding the at least two contact surfaces of the first and second structural members to construct the preform such that the preform defines an elongate friction weld joint and has dimensions approximating the dimensions of the machined structural assembly to thereby reduce material waste and machining time when forming the machined structural assembly, wherein said selecting step comprises selecting structural members with a combined mass of at least about twice the mass of the machined structural assembly.

2. A method according to claim 1 wherein said friction welding step comprises:

moving at least one of the first and second structural members relative to the other;

concurrently with said moving step, urging at least one of the first and second structural members toward the other to thereby generate frictional hear about the at least two contact surfaces;

terminating said moving step; and concurrently with said terminating step, urging at least one of the first and second structural members toward the other as the at least two contact surfaces cool to thereby form a friction weld joint at least partially between the at least two contact surfaces.

3. A method according to claim 2 wherein said moving step comprises oscillating at least one of the first and second structural members relative to the other structural member.

4. A method according to claim 2 wherein said moving step comprises simultaneously moving the first and second structural members in opposing directions, wherein the opposing directions are parallel to the at least two contact surfaces.

5. A method according to claim 1 further comprising forming a relief groove proximate to at least one of the at least two contact surfaces prior to said positioning step.

6. A method according to claim 1 further comprising cleaning at least one of the at least two contact surfaces prior to said positioning step.

7. A method according to claim 1 further comprising processing at least one of the first and second structural members before said friction welding step, wherein said processing step comprises a material treatment selected from the group consisting of heat treating, aging, quenching, stretching, annealing, and solution annealing.

8. A method according to claim 1 further comprising friction welding a third structural member to at least one of the first and second structural members.

9. A method of forming a machined structural assembly, comprising:

determining the dimensions of the machined structural assembly;

selecting first and second structural members based on the dimensions of the machined structural assembly, the structural members including excess material such that at least one of the structural members is larger in at least one dimension than the corresponding dimension of the machined structural assembly;

positioning the first structural member adjacent the second structural member so as to define at least two contact surfaces therebetween; and linear friction welding the at least two contact surfaces of the first and second structural members to construct a preform such that the preform defines an elongate friction weld joint and has dimensions approximating the dimensions of the machined structural assembly; and thereafter, machining the preform to remove the excess material from the preform including at least a portion of the elongate weld joint to form the machined structural assembly defining the elongate friction weld joint and having the predetermined dimensions, at least one of the structural members defining a machined surface adjacent the elongate friction weld joint, wherein said machining step comprises removing at least about one-half of the mass of the preform such that the structural member has a mass of less than about one-half of the preform.

10. A method according to claim 9 wherein said friction welding step comprises:

moving at least one of the first and second structural members relative to the other;

concurrently with said moving step, urging at least one of the first and second structural members toward the other to thereby generate frictional heat about the at least two contact surfaces;

terminating said moving step; and concurrently with said terminating step, urging at least one of the first and second structural members toward the other as the at least two contact surfaces cool to thereby form a friction weld joint at least partially between the at least two contact surfaces.

11. A method according to claim 10 wherein said moving step comprises simultaneously moving the first and second structural members in opposing directions, wherein the opposing directions are parallel to the at least two contact surfaces.

12. A method according to claim 10 wherein said moving step comprises oscillating at least one of the first and second structural members relative to the other structural member.

13. A method according to claim 9 further comprising forming a relief groove proximate to at least one of the at least two contact surfaces before said positioning step.

14. A method according to claim 9 further comprising cleaning at least one of the at least two contact surfaces prior to said positioning step.

15. A method according to claim 9 wherein said machining step comprises machining at least a portion of the friction weld joint joining the first and second structural members.

16. A method according to claim 9 further comprising processing at least one of the first and second structural members before said friction welding step, wherein said processing step comprises a material treatment selected from the group consisting of heat treating, aging, quenching, stretching, annealing, and solution annealing.

17. A method according to claim 9 further comprising processing the preform before said machining step, wherein said processing step comprises a material treatment selected from the group consisting of heat treating, aging, quenching, stretching, annealing, and solution annealing.

18. A method according to claim 9 further comprising friction welding a third structural member to at least one of the first and second structural members.

19. A method according to claim 9 wherein said machining step comprises machining each of the structural members adjacent the elongate weld joint such that each of the structural members defines a machined surface adjacent the elongate weld joint.

20. A method according to claim 1 wherein said selecting step comprises selecting at least one of the structural members defining the excess material over an entire exposed surface.

21. A method according to claim 1 wherein said determining step comprises determining a curved contour of the structural member and wherein said selecting and linear friction welding steps comprise selecting and welding the structural members as rectangular blocks.

22. A method according to claim 9 wherein said machining step comprises removing excess material from an entire exposed surface of at least one of the structural members.

23. A method according to claim 9 wherein said selecting and linear fiction welding steps comprise selecting and welding the structural members as rectangular blocks and wherein said machining step comprises machining at least one of the structural members to define a curved contour.

* * * * *